(12) United States Patent
Koryakovskiy et al.

(10) Patent No.: US 10,074,188 B2
(45) Date of Patent: Sep. 11, 2018

(54) METHOD AND APPARATUS FOR PROCESSING IMAGES FOR USE WITH A THREE-DIMENSIONAL HAND MODEL DATABASE

(71) Applicant: Samsung Electronics Co., Ltd., Suwon-si, Gyeonggi-do (KR)

(72) Inventors: Ivan Koryakovskiy, Delft (NL); Seong-oh Lee, Yongin-si (KR); Moon-sik Jeong, Seongnam-si (KR); Sung-do Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 14/476,265

(22) Filed: Sep. 3, 2014

(65) Prior Publication Data

US 2015/0071494 A1 Mar. 12, 2015

(30) Foreign Application Priority Data

Sep. 6, 2013 (KR) ........................ 10-2013-0107497

(51) Int. Cl.
*G06K 9/00* (2006.01)
*G06T 7/20* (2017.01)
*G06K 9/32* (2006.01)
*G06T 7/246* (2017.01)

(52) U.S. Cl.
CPC ........ *G06T 7/2046* (2013.01); *G06K 9/00208* (2013.01); *G06K 9/00389* (2013.01); *G06K 9/3241* (2013.01); *G06T 7/251* (2017.01)

(58) Field of Classification Search
CPC .......... G06K 9/00208; G06K 9/00389; G06K 9/3241; G06T 7/2046
See application file for complete search history.

(56) References Cited

U.S. PATENT DOCUMENTS

| 9,323,352 B1* | 4/2016 | Haskin .................. G06F 3/0346 |
| 2004/0103093 A1 | 5/2004 | Furuhashi et al. |
| 2011/0129124 A1 | 6/2011 | Givon |
| 2012/0309532 A1 | 12/2012 | Ambrus et al. |

(Continued)

FOREIGN PATENT DOCUMENTS

DE    10 2006 006 370 A1    10/2007

OTHER PUBLICATIONS

Shimada, Nobutaka, Kousuke Kimura, and Yoshiaki Shirai. "Real-time 3D hand posture estimation based on 2D appearance retrieval using monocular camera." Recognition, Analysis, and Tracking of Faces and Gestures in Real-Time Systems, 2001. Proceedings. IEEE ICCV Workshop On. IEEE, 2001.*

(Continued)

*Primary Examiner* — Nirav G Patel
(74) *Attorney, Agent, or Firm* — Jefferson IP Law, LLP

(57) ABSTRACT

A method and apparatus for processing an image, whereby a 3-dimensional (3D) hand model corresponding to a hand image obtained may be generated by capturing an image of a hand of a person are provided. The method includes preparing a 3D hand model database, receiving a 2-dimensional (2D) hand image obtained by capturing an image of a first hand, and detecting a first 3D hand model corresponding to the 2D hand image by using the 3D hand model database.

19 Claims, 22 Drawing Sheets

(56) References Cited

U.S. PATENT DOCUMENTS

2014/0241570 A1* 8/2014 Onen ..................... G06F 3/017
                                                              382/103

OTHER PUBLICATIONS

Shimada et al.; Real-time 3-D Hand Posture Estimation based on 2-D Appearance Retrieval Using Monocular Camera; IEEE; XP-002292538; Jul. 13, 2001; Japan.

Wang et al.; Tracking of Deformable Human Hand in Real Time as Continuous Input for Gesture-based Interaction; XP055153775; Jan. 1, 2007; China.

* cited by examiner

Fitness:   0.8        0.75        0.9        0.73        0.6

METHOD AND APPARATUS FOR PROCESSING IMAGES FOR USE WITH A THREE-DIMENSIONAL HAND MODEL DATABASE

CROSS-REFERENCE TO RELATED APPLICATION(S)

This application claims the benefit of a Korean patent application filed on Sep. 6, 2013, in the Korean Intellectual Property Office and assigned Serial number 10-2013-0107497, the entire disclosure of which is hereby incorporated by reference.

TECHNICAL FIELD

The present disclosure relates to a method and apparatus for processing an image, and more particularly, to a method and apparatus for processing an image which are capable of generating a 3-dimensional (3D) hand model corresponding to a hand image obtained by photographing a hand of a person.

BACKGROUND

Various types of interface apparatuses such as remote controllers, buttons, and touch screens have been developed to control electronic apparatuses.

In the case of a remote controller including buttons, a user has to be fully aware of each function corresponding to each button. Also, during use, the user may press a button by mistake or a button may be wrongly pressed due to an external factor regardless of an intention of the user. Alternatively, a button may not be pressed due to wear over time.

In the case of a control apparatus including a touch screen, the touch screen is realized by using a 2-dimensional (2D) plane. Accordingly, the degree of freedom of the area controllable by a user may be limited to 2 dimensions.

Recently, a technology has been introduced for obtaining 2D information from an input image by using a tracking apparatus and controlling an electronic apparatus by using the 2D information. For example, the tracking apparatus may detect a location of a hand, a location of a finger, or whether a hand is opened. The electronic apparatus may be controlled based on a detection result.

Alternatively, when a 3D motion recognition apparatus is used, a location or movement of each region of a user may be recognized. However, in order to use the 3D motion recognition apparatus, a separate sensor has to be attached to the body of the user, and thus, use of the 3D motion recognition apparatus may be inconvenient. Also, the 3D motion recognition apparatus may not be economically feasible due to high costs compared to a camera capable of capturing a 2D image.

SUMMARY

Aspects of the present disclosure are to address at least the above-mentioned problems and/or disadvantages and to provide at least the advantages described below. Accordingly, an aspect of the present disclosure is to provide an apparatus and method and apparatus for processing an image.

Various embodiments of the present disclosure include a method and apparatus for processing an image, whereby a 3D hand model corresponding to a hand image obtained by photographing a hand of a person may be generated by using the hand image.

Various embodiments of the present disclosure include a method and apparatus for processing an image, whereby a 3D hand model corresponding to a 2D hand image may be generated by using the 2D hand image only, without having to use a separate 2D motion recognition apparatus.

Various embodiments of the present disclosure include a method and apparatus for processing an image, whereby a user may control a 3D area by using only a camera capable of capturing a 2D image.

Various embodiments of the present disclosure include a method and apparatus for processing an image, whereby an interface for intuitively controlling an electronic apparatus may be provided by using only a camera capable of capturing a 2D image.

Additional aspects will be set forth in part in the description which follows and, in part, will be apparent from the description, or may be learned by practice of the presented various embodiments.

According to one or more various embodiments of the present disclosure, a method of processing an image, the method includes preparing a 3-dimensional (3D) hand model database, receiving a 2-dimensional (2D) hand image obtained by capturing an image of a first hand, and detecting a first 3D hand model corresponding to the 2D hand image by using the 3D hand model database.

The preparing of the 3D hand model database may include capturing a second 3D hand model corresponding to a second hand by using a motion capture apparatus, setting a parameter for the second 3D hand model, changing a position of the second 3D hand model, projecting the second 3D hand model on the 2D hand image, extracting a feature vector from the 2D hand image, and storing the parameter, the position of the second 3D hand model, and the feature vector in the 3D hand model database.

The parameter may include at least one of a length of the second 3D hand model, an area of the second 3D hand model, and a length of each finger included in the second 3D hand model.

The detecting of the first 3D hand model may include detecting at least one candidate region corresponding to the first hand from the 2D hand image, performing a first masking on a remaining region obtained by excluding a first candidate region selected from the at least one candidate region from the second 2D image, detecting a first 3D hand model candidate based on a second 2D hand image obtained by performing the first masking, and selecting the first 3D hand model based on the first 3D had model candidate.

The detecting of the at least one candidate region may include detecting at least two candidate regions, and the method may further include, after detecting of the first 3D hand model candidate, performing second masking on a remaining region obtained by excluding from the 2D hand image a second candidate region that is selected from the at least one candidate region, wherein the second candidate region is different from the first candidate region, and detecting a second 3D hand model candidate based on the second 2D hand image obtained by performing the second masking, wherein the first 3D hand model may be selected from among the first 3D hand model candidate and the second 3D hand model candidate.

The detecting of the at least one candidate region may include detecting at least one region corresponding to a skin color from the 2D hand image by using a skin color model.

The method may further include, after the selecting of the first 3D hand model candidate, updating the skin color model based on information about the at least one candidate region.

The detecting of the at least one candidate region may include detecting at least one region in which movement is detected from the 2D hand image.

The detecting of the at least one candidate region may include detecting at least one region corresponding to a skin color from the 2D hand image based on a depth image captured by using a depth camera and a skin color model.

The detecting of the first 3D hand model candidate may include extracting a feature vector from the second 2D hand image obtained by performing the first masking, searching for at least one third 3D hand model candidate corresponding to the extracted feature vector using the 3D hand model database, and selecting one of the at least one third 3D hand model candidate as the first 3D hand model candidate.

The selecting one of the at least one third 3D hand model candidate as the first 3D hand model candidate may include: applying a weight to each of the at least one third 3D hand model candidate, and selecting one of the at least one third 3D hand model candidate according to the applied weights.

The extracting of the feature vector from the second 2D hand image obtained by performing the first masking may include: extracting information about a shape of the first candidate region based on the second 2D hand image obtained by performing the first masking, extracting a feature point in the first candidate region based on the second 2D hand image obtained by performing the first masking, and generating the feature vector based on the extracted information about the shape of the first candidate region and the extracted feature point.

According to one or more various embodiments of the present disclosure, a method of processing an image, the method includes: preparing a 3-dimensional (3D) hand model database, receiving a first 2-dimensional (2D) hand image obtained by capturing an image of a first hand in a first position, detecting a first parameter of the first hand based on the first 2D hand image, receiving a second 2D hand image obtained by capturing an image of the first hand in a second position, and detecting a first 3D hand model corresponding to the second 2D hand image using the 3D hand model database and the first parameter.

The preparing of the 3D hand model database may include: capturing a second 3D hand model corresponding to a second hand by using a motion capture apparatus, setting a second parameter for the second 3D hand model, changing a position of the second 3D hand model, projecting the second 3D hand model on the 2D hand image, extracting a feature vector from the 2D hand image, and storing the second parameter, the position of the second 3D hand model, and the feature vector in the 3D hand model database.

The detecting of the first 3D hand model may include: detecting at least one candidate region corresponding to the first hand from the second 2D hand image, performing masking on a remaining region obtained by excluding one candidate region selected from among the at least one candidate region from the second 2D hand image, detecting at least one 3D hand model candidate based on the second 2D hand image obtained by performing the masking and the first parameter, and selecting one of the at least one 3D hand model candidate as the first 3D hand model.

The detecting of the at least one 3D hand model candidate may include: extracting a feature vector from the second 2D hand image obtained by performing the masking, and searching for the at least one 3D hand model candidate corresponding to the first parameter and the extracted feature vector using the 3D hand model database.

The method may further include, after the detecting of the first 3D hand model, adjusting a position of the first 3D hand model based on the second 2D hand image.

The adjusting of the position of the first 3D hand model may include: extracting a first edge of the first hand from the second 2D hand image, changing a position of the first 3D hand model, calculating a difference value by comparing the first edge and a second edge of the first hand extracted using the first 3D hand model, acquiring a plurality of difference values for a plurality of positions of the first 3D hand model, and selecting a position from among the plurality of positions of the first 3D hand model that has a smallest corresponding difference value.

According to one or more various embodiments of the present disclosure, an apparatus configured to process an image, the apparatus including an input unit configured to receive a 2-dimensional (2D) hand image, a 3-dimensional (3D) hand model database configured to store information about at least one 3D hand model, and a 3D hand model detector configured to detect the a 3D hand model corresponding to the 2D hand image using the 3D hand model database.

The apparatus may further include a position adjuster configured to adjust a position of the detected 3D hand model based on the 2D hand image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
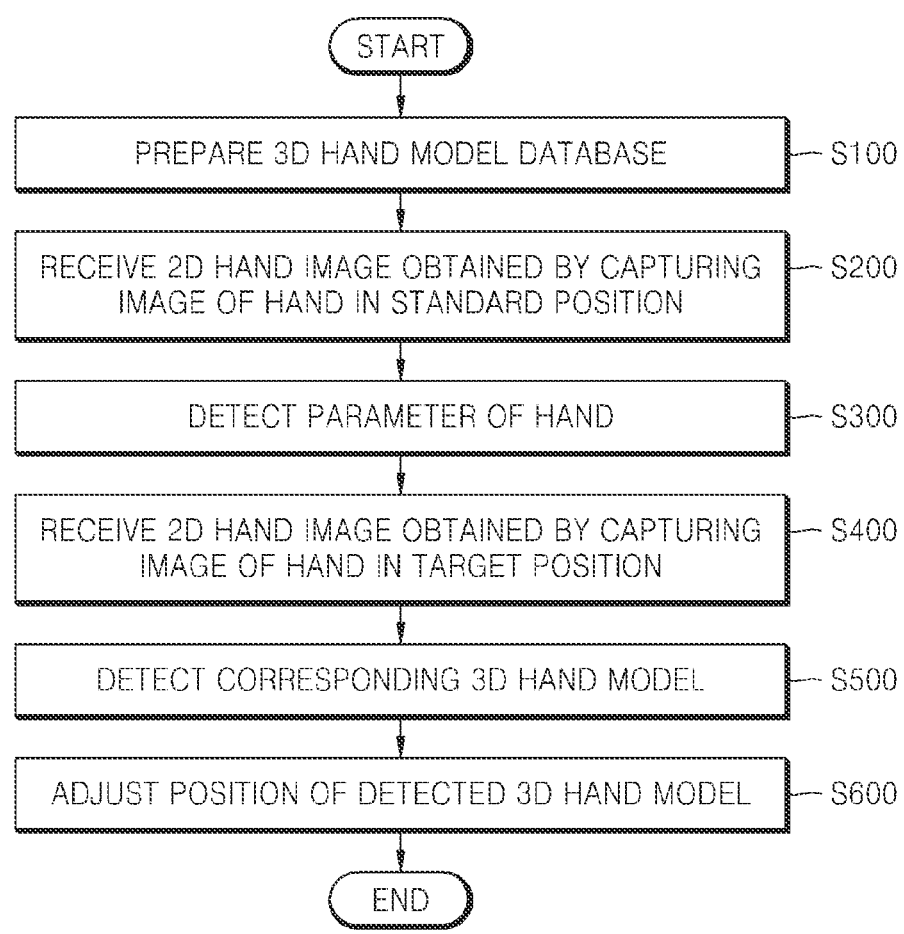
FIG. 1 is a flowchart of a method of processing an image, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference will now be made in detail to various embodiments, examples of which are illustrated in the accompanying drawings, wherein like reference numerals refer to like elements throughout. In this regard, the present various embodiments may have different forms and should not be construed as being limited to the descriptions set forth herein. Accordingly, the various embodiments are merely described below, by referring to the figures, to explain aspects of the present description. Expressions such as "at least one of," when preceding a list of elements, modify the entire list of elements and do not modify the individual elements of the list.

While such terms as "first," "second," etc., may be used to describe various components, such components must not be limited to the above terms. The above terms are used only to distinguish one component from another. For example, a first component may be a second component within the technical scope of the present disclosure.

The terms used in the present specification are merely used to describe particular various embodiments, and are not intended to limit the present disclosure. An expression used in the singular encompasses the expression in the plural, unless it has a clearly different meaning in the context. In the present specification, it is to be understood that terms such as "including" or "having," etc., are not intended to preclude the possibility that one or more other features, numbers, steps, actions, components, parts, or combinations thereof may exist or may be added.

Unless otherwise defined, all terms used herein have the same meanings as commonly understood by one of ordinary skill in the art to which this disclosure belongs. It will be further understood that terms such as those defined in commonly used dictionaries should be interpreted as having meanings that are consistent with their meanings in the context of the relevant art and will not be interpreted in an idealized or overly formal sense unless expressly so defined herein.

Hereinafter, a method of processing an image and an apparatus 100 for processing an image, according to one or more various embodiments of the present disclosure will be described in detail with reference to FIGS. 1 through 26.

FIG. 1 is a flowchart of a method of processing an image, according to an embodiment of the present disclosure.

Referring to FIG. 1, in the method according to an embodiment, a 3D hand model database 120 (FIG. 26) may be prepared first in operation S100.

Figure 2:
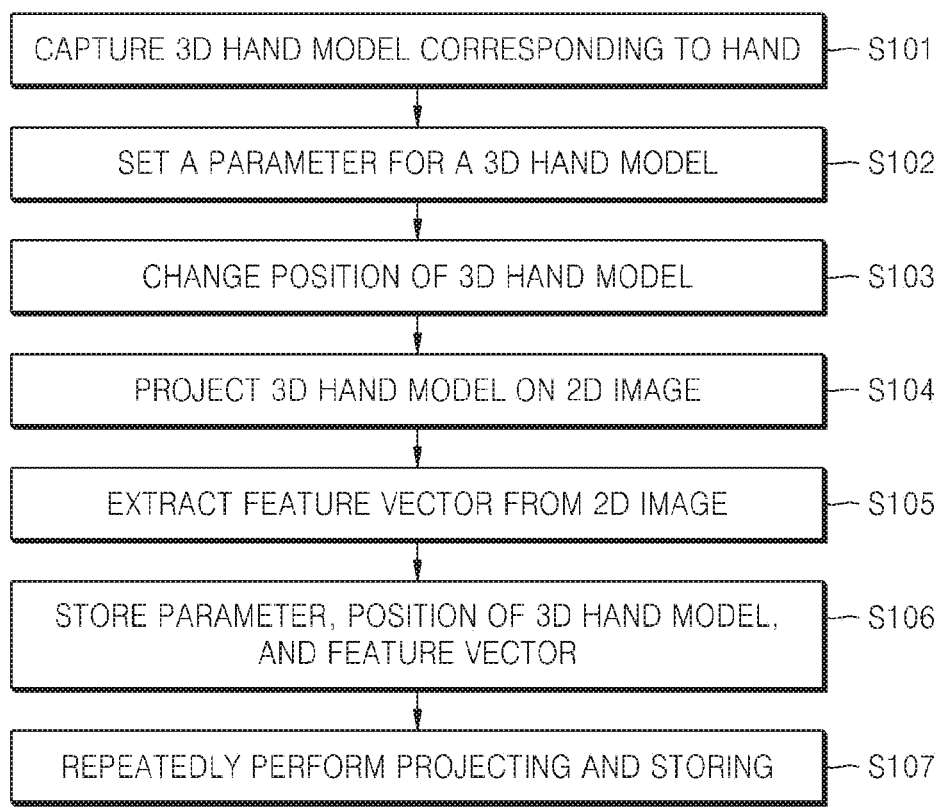
FIG. 2 is a flowchart of a process of preparing a 3-dimensional (3D) hand model database, according to an embodiment of the present disclosure.

FIG. 2 is a flowchart of a process of preparing a 3D hand model database 120 in operation S100 of FIG. 1, according to an embodiment of the present disclosure. Referring to FIG. 2, the 3D hand model database 120 may be prepared in operation S100 by first capturing a 3D hand model corresponding to a hand by using a motion capture apparatus in operation S101.

A CyberGlove product, for example, may be used as the motion capture apparatus. An image of a hand of any person may be captured by using the motion capture apparatus. Also, any position of the hand may be captured. Each captured position of the hand may be converted to a 3D hand model. In other words, information about a location or rotation of the hand or each joint of fingers of the hand may be obtained by using the motion capture apparatus, and a captured image of a hand may be converted to a 3D hand model by using the obtained information.

Then, in operation S102, a parameter may be set according to the 3D hand model. The parameter may be related to an attribute of the 3D hand model. For example, the parameter may include at least one of information about a length of the 3D hand model, information about an area of the 3D hand model, and information about a length of each finger included in the 3D hand model.

Even when 3D hand models are captured by targeting a certain position of a hand of a certain person, parameters may be differently set to generate different 3D hand models. Operations performed hereinafter may be individually performed on each 3D hand model.

Next, a position of the 3D hand model may be changed in operation S103. For example, a certain finger of the 3D hand model may be bent more than other fingers. Alternatively, for example, the hand may be further opened or may be rotated by another angle or in another direction.

As such, by variously changing the position of the 3D hand model, different 3D hand models having various positions may be generated even if the 3D hand models are captured by targeting a certain position of a hand of a certain person. Operations performed hereinafter may be individually performed on each 3D hand model.

Then, the 3D hand model may be projected on a 2D image in operation S104. Accordingly, when the 3D hand model is viewed from a certain viewpoint, a figure may be obtained.

A feature vector may be extracted from the 2D image in operation S105. The feature vector may correspond to the 2D image. Thus, the feature vector may correspond to a certain position of a certain 3D hand model. The feature vector may include, for example, information about an edge of a finger or a hand, or information about a direction a hand or a finger is facing.

The parameter, the position of the 3D hand model, and the feature vector may be stored in a 3D hand model database 120 in operation S106. Accordingly, the position of the 3D hand model and the feature vector may be related to each other. Also, the feature vector may be used to search for a related 3D hand model.

The position or the parameter of the 3D hand model may be changed, and operations S104 through S106 may be repeatedly performed in operation S107. Accordingly, information about various 3D hand models in various positions may be stored in the 3D hand model database 120.

Referring back to FIG. 1, a 2D hand image obtained by capturing an image of a hand in a standard position may be received in operation S200. In other words, before receiving a 2D hand image to be converted to a 3D hand model, a 2D hand image obtained by capturing an image of a hand in a standard position may be received first.

Figure 3:
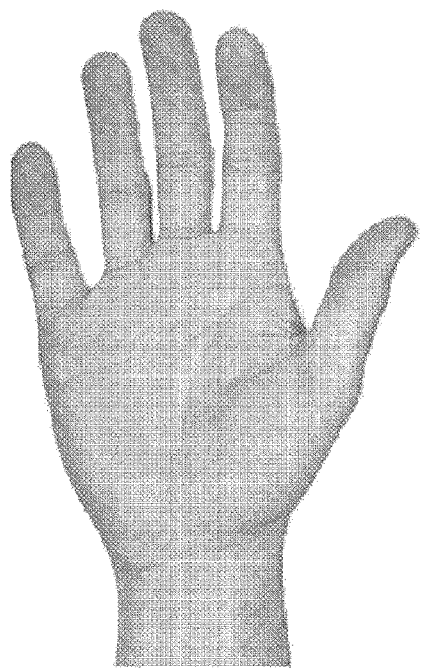
FIG. 3 is a 2-dimensional (2D) hand image obtained by capturing a hand in a standard position, according to an embodiment of the present disclosure.

FIG. 3 is a 2D hand image obtained by capturing an image of a hand in a standard position, according to an embodiment of the present disclosure. As shown in FIG. 3, the standard position may be an opened hand.

Referring back to FIG. 1, a parameter of the hand may be detected by using the received 2D hand image in operation S300. In other words, a basic feature of a target hand may be detected by using a 2D hand image obtained by capturing an image of a hand in a standard position. A parameter may include, for example, information about a length of a target hand, an area of the target hand, and a length of each finger of the target hand.

Figure 4:
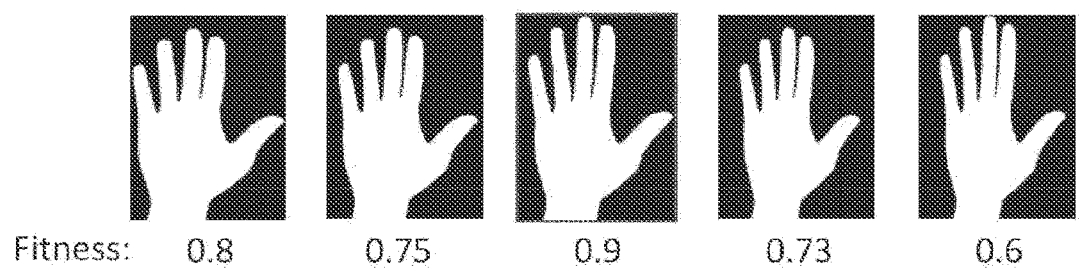
FIG. 4 illustrates a process of detecting a parameter of a hand by using a 2D hand image obtained by capturing the hand in a standard position, according to an embodiment of the present disclosure.

FIG. 4 illustrates a process of detecting the parameter of the hand by using the 2D hand image obtained in the standard position, according to an embodiment of the present disclosure.

Referring to FIG. 4, the 2D hand image obtained in the standard position may be compared with each 3D hand model stored in the 3D hand model database. At least one 3D hand model having the same position as the standard position may be selected from the 3D hand models stored in the 3D hand model database. A similarity between the selected 3D hand model and the 2D hand image may be calculated. A 3D hand model having the highest similarity may be selected again.

A parameter corresponding to the selected 3D hand model may be detected from among the parameters stored in the 3D hand model database 120. By using the detected parameter, a basic feature of the hand of the 2D hand image may be detected. The detected parameter may be used to detect a 3D hand model corresponding to the 2D hand image received later.

Figure 5:
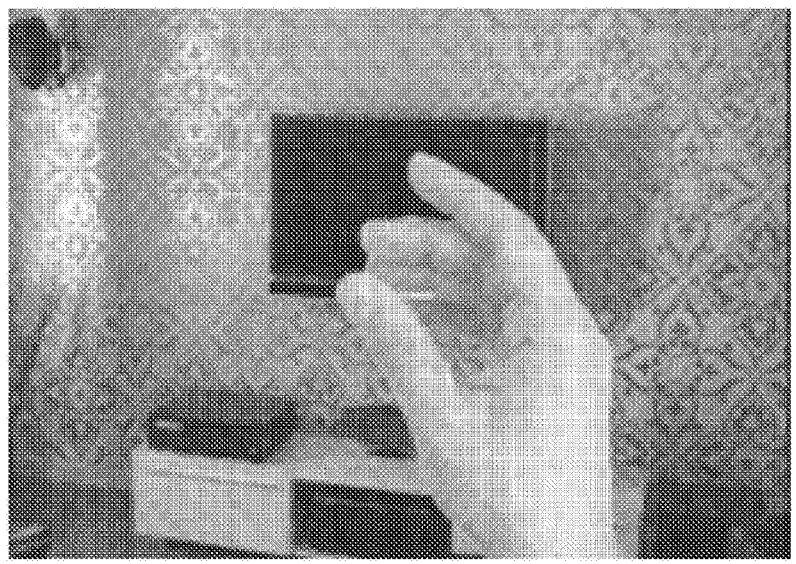
FIG. 5 is a 2D hand image obtained by capturing a hand in a target position, according to an embodiment of the present disclosure.

Referring back to FIG. 1, a 2D hand image obtained by capturing an image of the hand in a target position may be received in operation S400. The received 2D hand image may be converted to a 3D hand model via operations to be described later. FIG. 5 is the 2D hand image obtained by capturing an image of the hand in the target position, according to an embodiment of the present disclosure.

Referring back to FIG. 1, a 3D hand model corresponding to the 2D hand image obtained by capturing an image of the hand in the target position may be detected in operation S500 by using the 3D hand model database 120 and the parameter.

Figure 6:
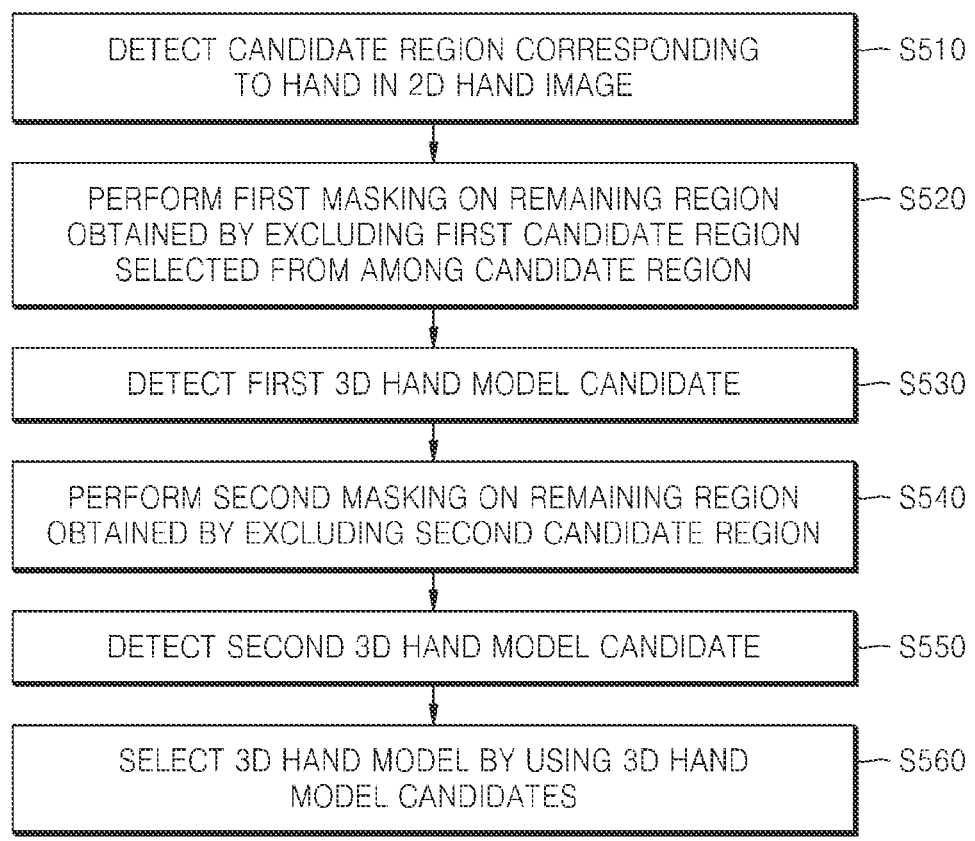
FIG. 6 is a flowchart of a process of detecting a 3D hand model corresponding to a 2D hand image, according to an embodiment of the present disclosure.

FIG. 6 is a flowchart of a process of detecting the 3D hand model corresponding to the 2D hand image in operation S500, according to an embodiment of the present disclosure. Referring to FIG. 6, the 3D hand model is detected in operation S510 by detecting at least one candidate region corresponding to the hand in the 2D hand image in operation S510.

The candidate region may be detected so as to detect which portion of the received 2D hand image corresponds to the hand. In order to detect the candidate region, a predefined skin color model may be used. At least one region corresponding to a skin color in the 2D hand image may be detected as the at least one candidate region by using the skin color model.

Alternatively, according to another embodiment of the present disclosure, at least one region of the 2D hand image where movement is detected may be detected as the at least one candidate region, instead of using the skin color model. In other words, when at least two 2D hand images are received, the at least two 2D hand images may be compared with each other, thereby detecting a region where movement is generated as the candidate region.

Alternatively, according to another embodiment of the present disclosure, the skin color model and a depth image captured by using a depth camera may be used. At least one region corresponding to a skin color may be detected as the at least one candidate region from the 2D hand image by using the depth image and the skin color model. By further using the depth image as well as the skin color model, even if at least two regions that are continuously arranged to have skin colors, the at least two regions may be determined to be different regions if they have different depths.

A masking may be performed on a remaining region obtained by excluding a first candidate region selected from among the at least one candidate region from the second hand image, in operation S520. The first candidate region may be selected by obtaining a biggest connected component from a certain point in the at least one candidate region. In other words, a region that is in the at least one candidate region and includes all points continuously arranged from the certain point may be selected as the first candidate region.

The first candidate region is highly likely to correspond to the hand. When the first candidate region corresponds to the hand, a location of the first candidate region corresponds to a location of the hand in the 2D hand image, and a size of the first candidate region may correspond to a size of the hand. Accordingly, by calculating the size of the first candidate region, the size of the hand in the 2D hand image may be calculated.

Figure 7:
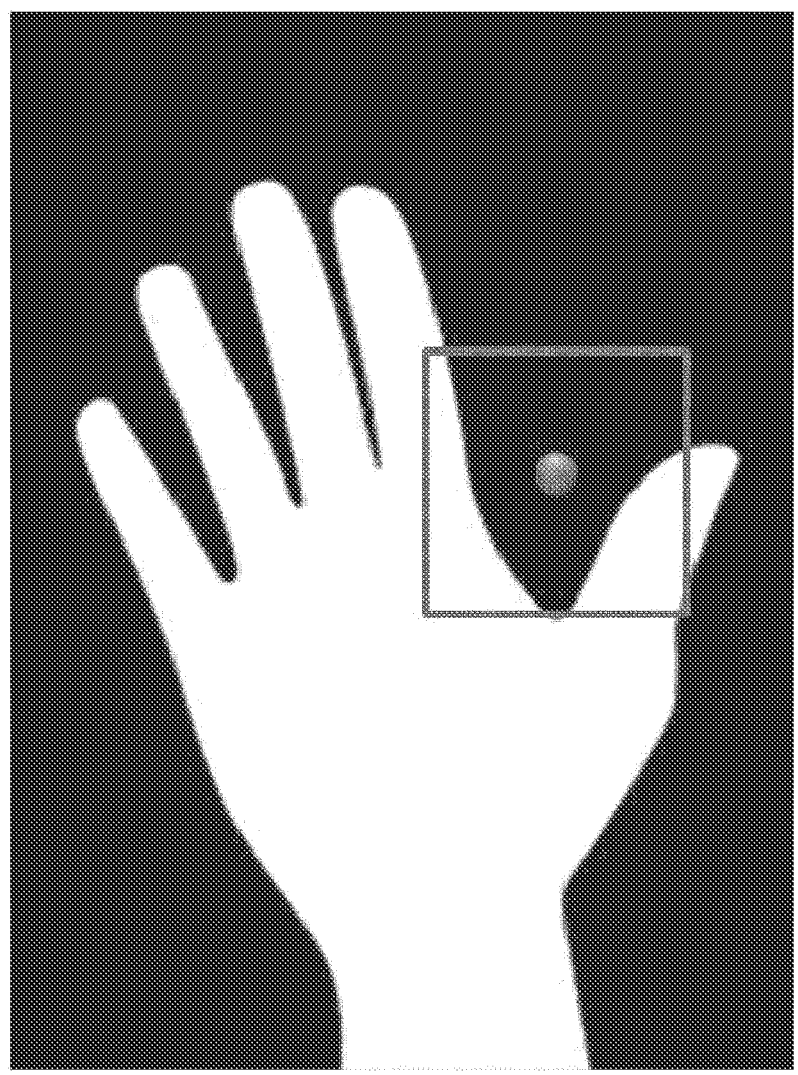
FIG. 7 illustrates a process of detecting a location and a size of a hand in a 2D hand image, according to an embodiment of the present disclosure.
Figure 8:
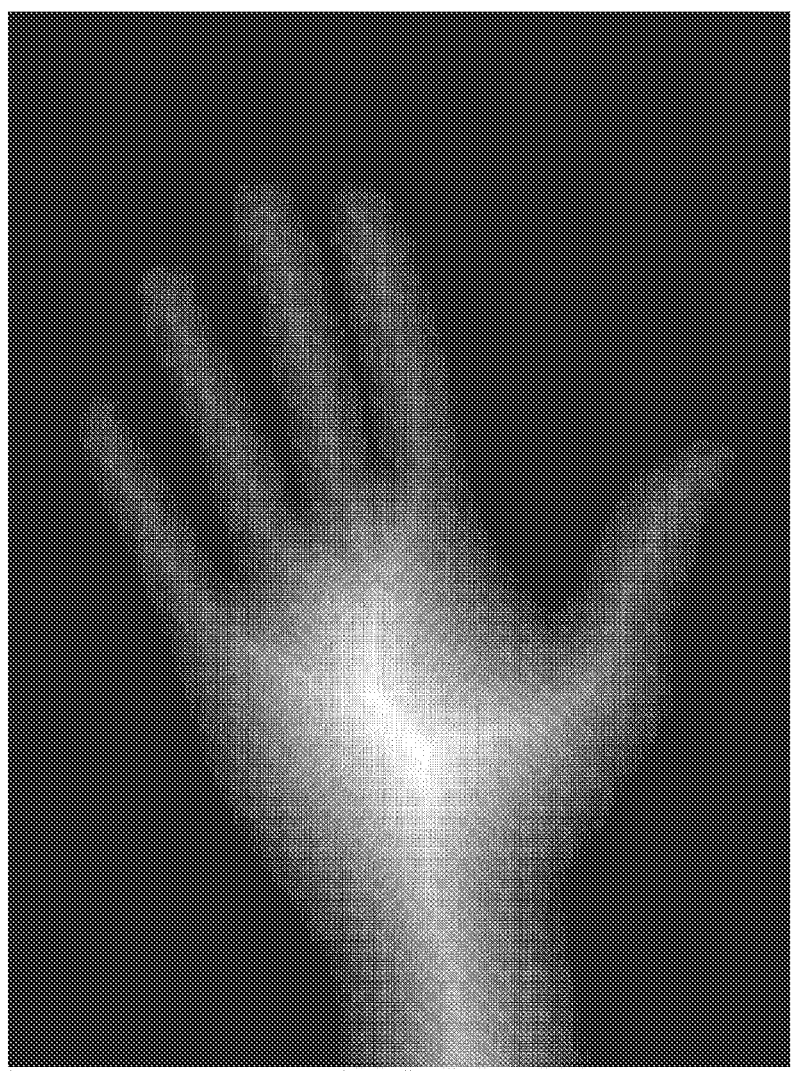
FIG. 8 illustrates a process of detecting a location and a size of a hand in a 2D hand image, according to an embodiment of the present disclosure.
Figure 9:
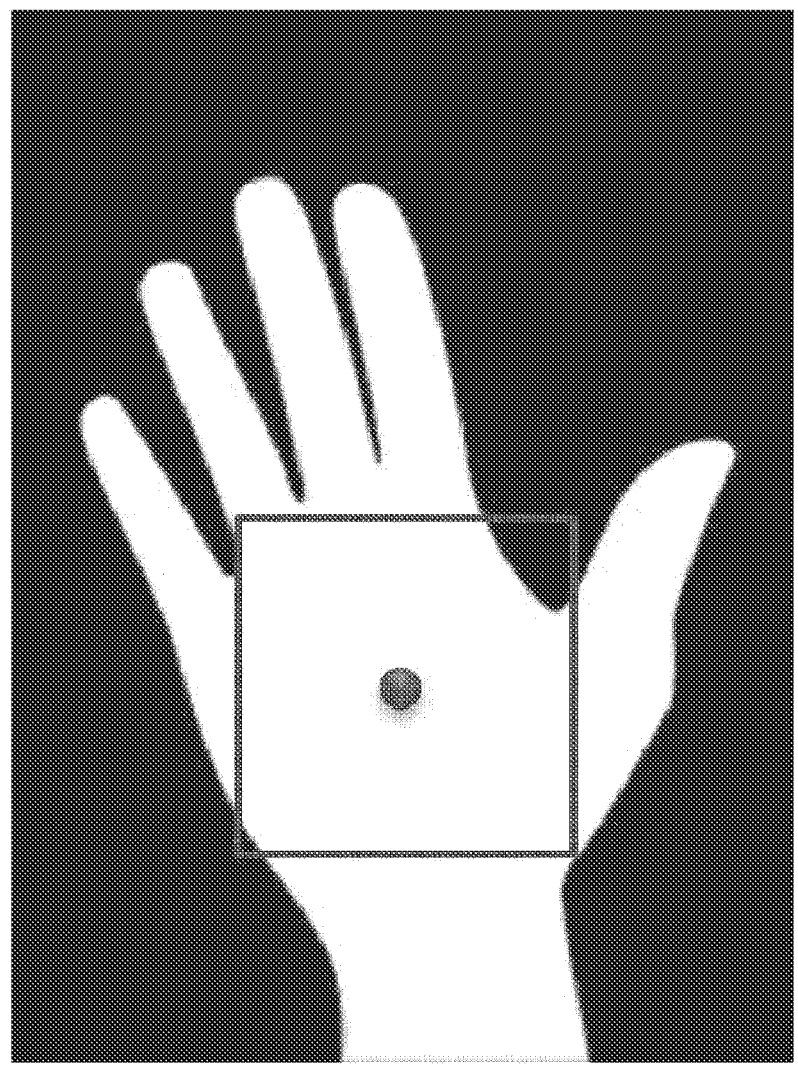
FIG. 9 illustrates a process of detecting a location and a size of a hand in a 2D hand image, according to an embodiment of the present disclosure.

FIGS. 7 to 9 illustrate a process of calculating the location and the size of the first candidate region. Referring to FIG. 7, the certain point may be selected first. As shown in FIG. 7, a location of the certain point may not be in the first candidate region.

A point that is in the first candidate region and closest to the certain point may be obtained. The largest connected component may be determined from the obtained point. As shown in FIG. 8, a point farthest to an edge of the largest connected component may be obtained by using a distance transform method.

Then, as shown in FIG. 9, a location of a center of the first candidate region may be obtained by using the obtained point. Also, a size of the first candidate region may be obtained by using a distance from the edge of the biggest connected component to the obtained point.

Figure 10:
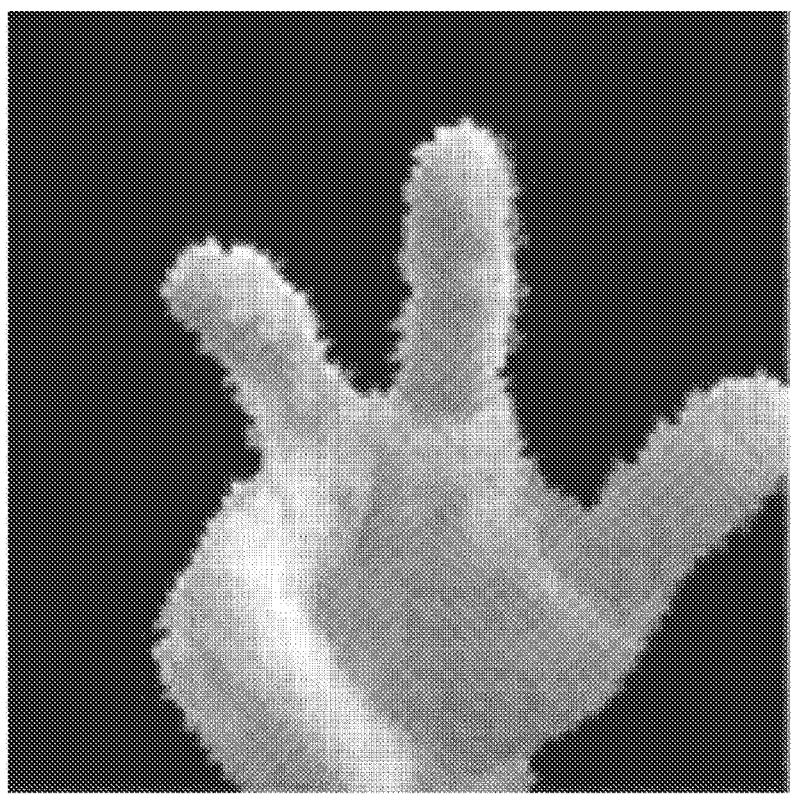
FIG. 10 is an image showing a result of masking a remaining region obtained by excluding a region corresponding to a hand in a 2D hand image, according to an embodiment of the present disclosure.

After the first candidate region is specified, masking may be performed on a remaining region excluding the first candidate region. For example, the remaining region may be filled in black. FIG. 10 is an image showing a result of masking a remaining region obtained by excluding a region corresponding to a hand in a 2D hand image, according to an embodiment of the present disclosure.

Referring back to FIG. 6, a first 3D hand model candidate may be detected in operation S530 by using the 2D hand image on which the first masking is performed.

Figure 11:
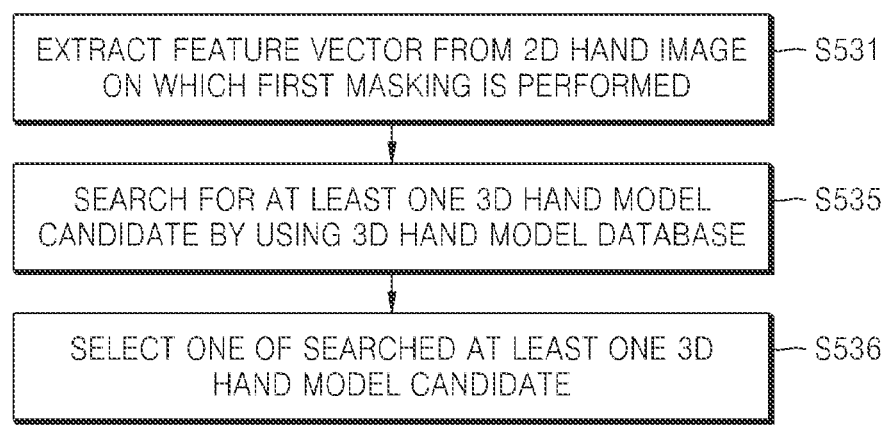
FIG. 11 is a flowchart of a process of detecting a candidate of a 3D hand model corresponding to a 2D hand image, according to an embodiment of the present disclosure.

FIG. 11 is a flowchart of a process of detecting the first 3D hand model candidate in operation S530 of FIG. 6, according to an embodiment of the present disclosure. Referring to FIG. 11, a feature vector may be extracted in operation S531 from the 2D hand image on which the first masking is performed.

Figure 12:
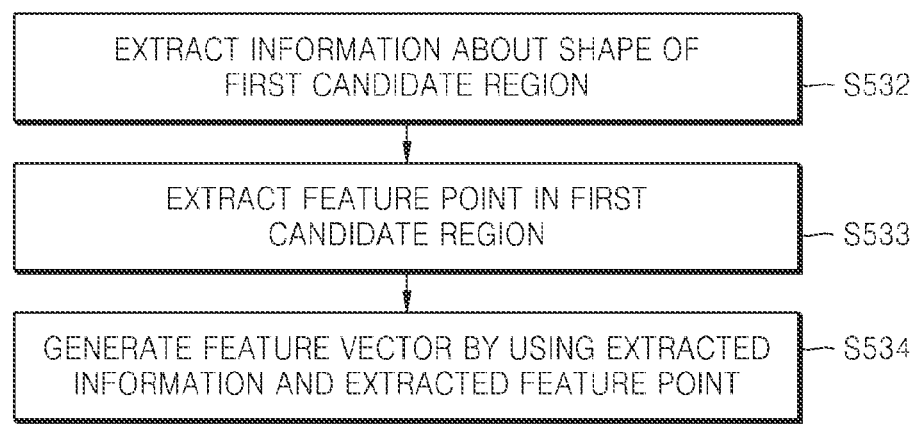
FIG. 12 is a flowchart of a process of extracting a feature vector from a masked 2D hand image, according to an embodiment of the present disclosure.

FIG. 12 is a flowchart of a process of extracting the feature vector from the 2D hand image on which the first masking is performed in operation S531, according to an embodiment of the present disclosure. Referring to FIG. 12, in operation S532, information about a shape of the first candidate region may be extracted by using the 2D hand image on which the first masking is performed.

Figure 13:
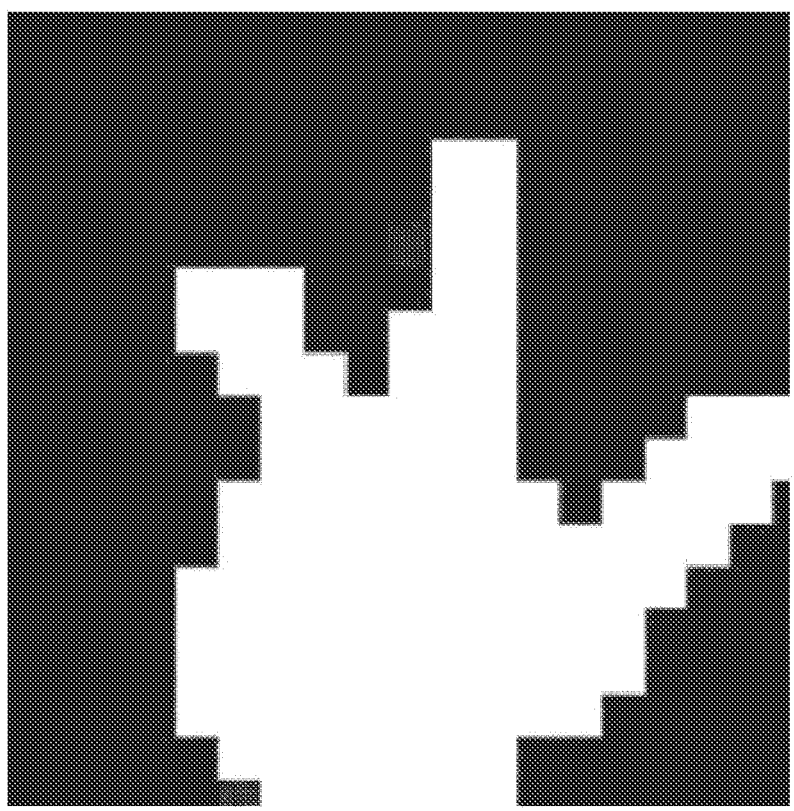
FIG. 13 illustrates a process of extracting information about a shape corresponding to a hand by using a masked 2D hand image, according to an embodiment of the present disclosure.

FIG. 13 illustrates a process of extracting the information about the shape of the first candidate region by using the 2D hand image on which the first masking is performed, according to an embodiment of the present disclosure. Color information of pixels included in the 2D hand image on which the first masking is performed may be converted to simpler information.

For example, as shown in FIG. 13, colors of the pixels included in the 2D hand image of FIG. 10 on which the first masking is performed may be converted to black or white. For example, colors of pixels in the first candidate region may be converted to white. Also, the information about the shape of the first candidate region may be extracted by detecting boundary points of black and white.

Referring back to FIG. 12, a feature point in the first candidate region may be extracted in operation S533 by using the 2D hand image on which the first masking is performed. The feature point may be a point that represents the first candidate region from among points in the first candidate region and may correspond to a location of an edge of a hand or finger, or a direction the hand or finger faces.

Figure 14:
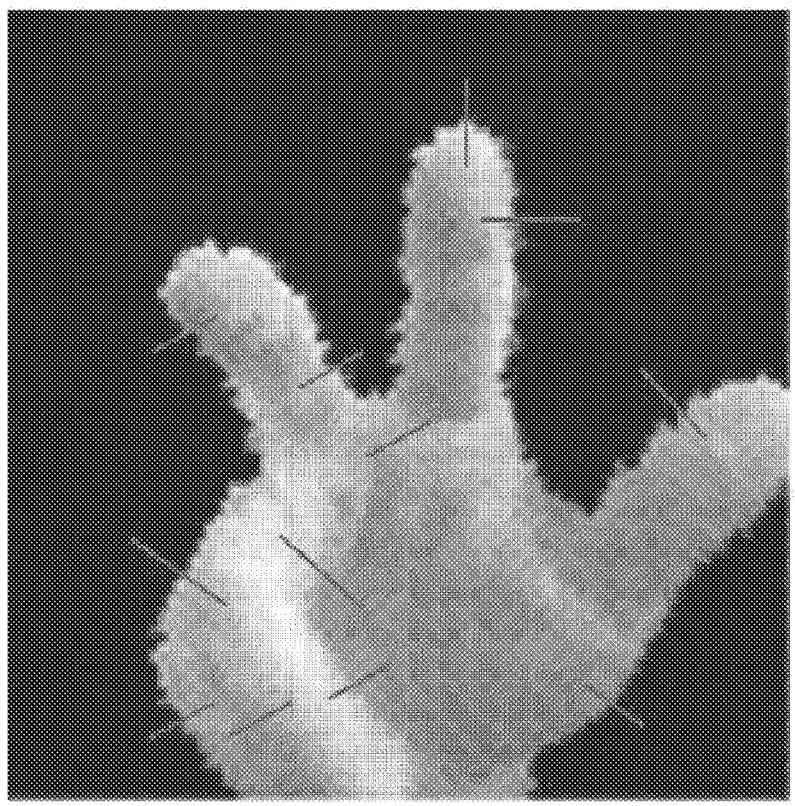
FIG. 14 illustrates a process of extracting a feature point in an image corresponding to a hand, by using a masked 2D hand image, according to an embodiment of the present disclosure.

FIG. 14 illustrates a process of extracting the feature point, according to an embodiment of the present disclosure. Referring to FIG. 14, a center of points having similar directions of normal lines of edges from among edges of a region, including pixels having a certain color or a color similar to the certain color, may be extracted as the feature point.

Alternatively, according to another embodiment of the present disclosure, a point where a color dramatically changes in the first candidate region, or a region where a direction of a normal line of an edge from among edges of the first candidate region dramatically changes, may be extracted as the feature point.

The number of feature points may be pre-determined. For example, the number of feature points may be from 10 to 15. Also, in order to reduce an amount of information to be processed and easily extract a feature point, information included in the 2D hand image on which the first masking is performed may be pre-converted to simpler information.

Referring back to FIG. 12, a feature vector may be generated by using the extracted information about the shape of the first candidate region and the extracted feature point, in operation S534. The feature vector may include information about the shape of the first candidate region and information about the feature point.

When the first candidate region corresponds to the hand, a position of the hand may be distinguished by using the information about the shape of the first candidate region and the information about the feature point which are included in the feature vector. FIGS. 15 to 18 illustrate a process of distinguishing the position of the hand by using information about a shape of a region corresponding to the hand, according to various embodiments of the present disclosure.

Figure 15:
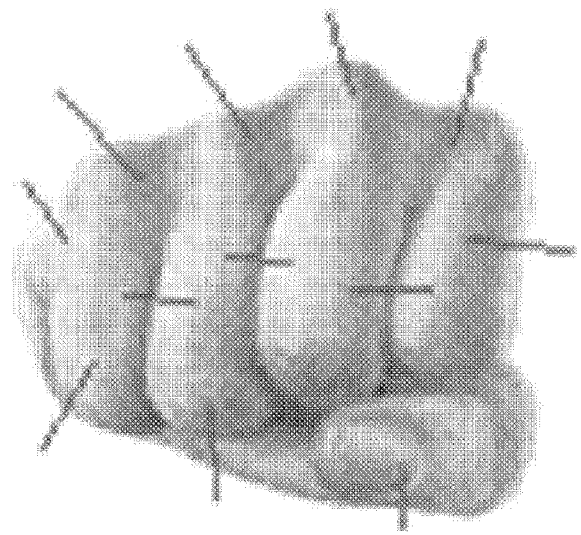
FIG. 15 illustrates a process of distinguishing a position of a hand by using information about a shape of a region corresponding to a hand, according to an embodiment of the present disclosure.
Figure 16:
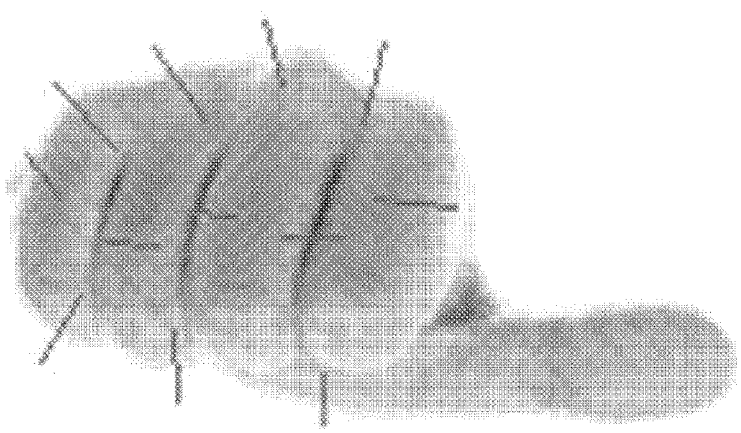
FIG. 16 illustrates a process of distinguishing a position of a hand by using information about a shape of a region corresponding to a hand, according to an embodiment of the present disclosure.

Referring to FIG. 15, feature points of a hand with a bent thumb are illustrated. Also, referring to FIG. 16, feature points of a hand with an opened thumb are illustrated. Since the number of extracted feature points may be limited, information about the feature points may be the same in FIGS. 15 and 16 despite of different positions of the hands. Thus, it may be difficult to distinguish a position of a hand by using only information about a feature point which is included in a feature vector.

Figure 17:
FIG. 17 illustrates a process of distinguishing a position of a hand by using information about a shape of a region corresponding to a hand, according to an embodiment of the present disclosure.
Figure 18:
FIG. 18 illustrates a process of distinguishing a position of a hand by using information about a shape of a region corresponding to a hand, according to an embodiment of the present disclosure.

However, when the information about the shape of the first candidate region, which is included in the feature vector is also used, the positions of the hands may be distinguished. FIG. 17 illustrates information about a shape of a region corresponding to the hand of FIG. 15, and FIG. 18 illustrates information about a shape of a region corresponding to the hand of FIG. 16. As such, the positions of the hand are distinguished since shapes of regions corresponding to the thumbs are clearly distinguished.

FIGS. 19 through 22 illustrate a process of distinguishing a position of a hand by using a feature point in a region corresponding to the hand, according to various embodiments of the present disclosure.

Figure 19:
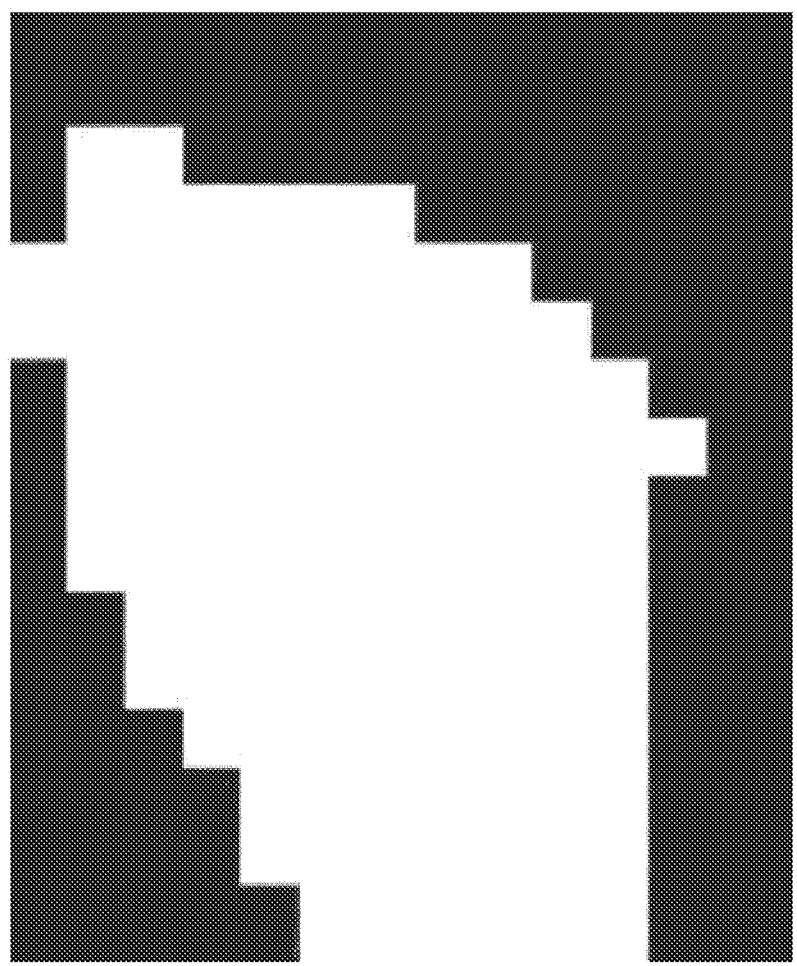
FIG. 19 illustrates a process of distinguishing a position of a hand by using a feature point in a region corresponding to a hand, according to an embodiment of the present disclosure.
Figure 20:
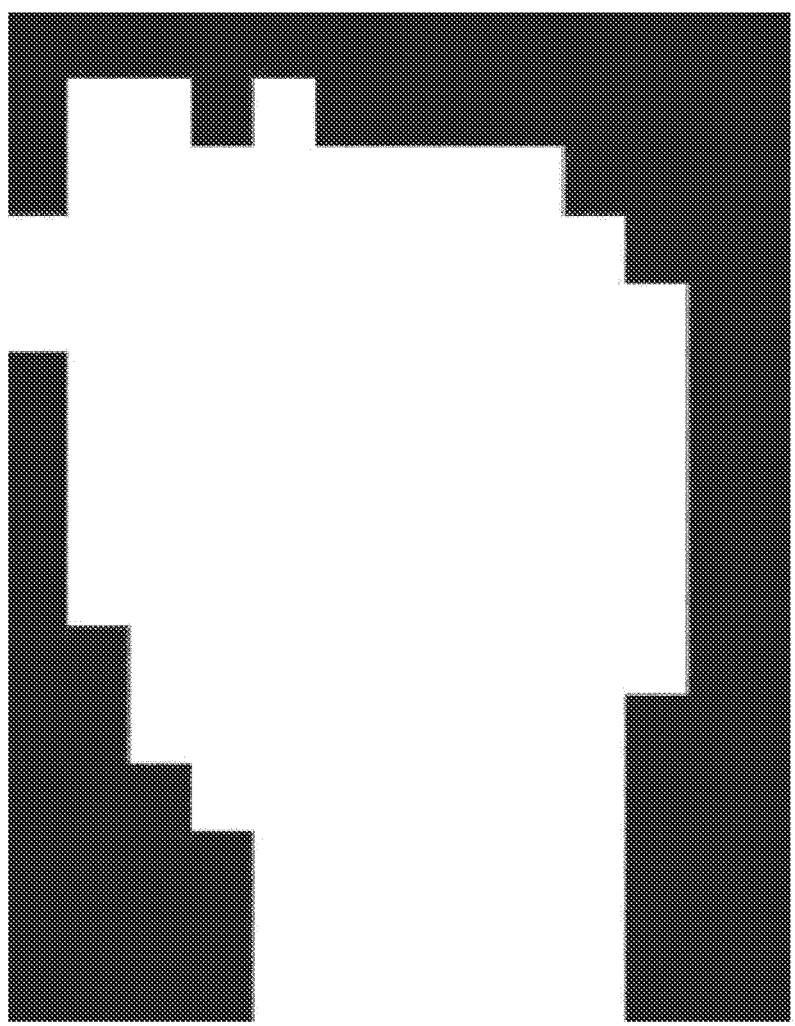
FIG. 20 illustrates a process of distinguishing a position of a hand by using a feature point in a region corresponding to a hand, according to an embodiment of the present disclosure.

Referring to FIG. 19, a shape of a region corresponding to a hand in a clenched position is shown. Also, referring to FIG. 20, a shape of a region corresponding to a hand in another clenched position is shown. However, locations or directions of fingers may not be able to be determined by only using the shape of FIG. 19 or 20. Accordingly, it may be difficult to distinguish the position of the hand by only using the information about the shape of the first candidate region which is included in the feature vector.

Figure 21:
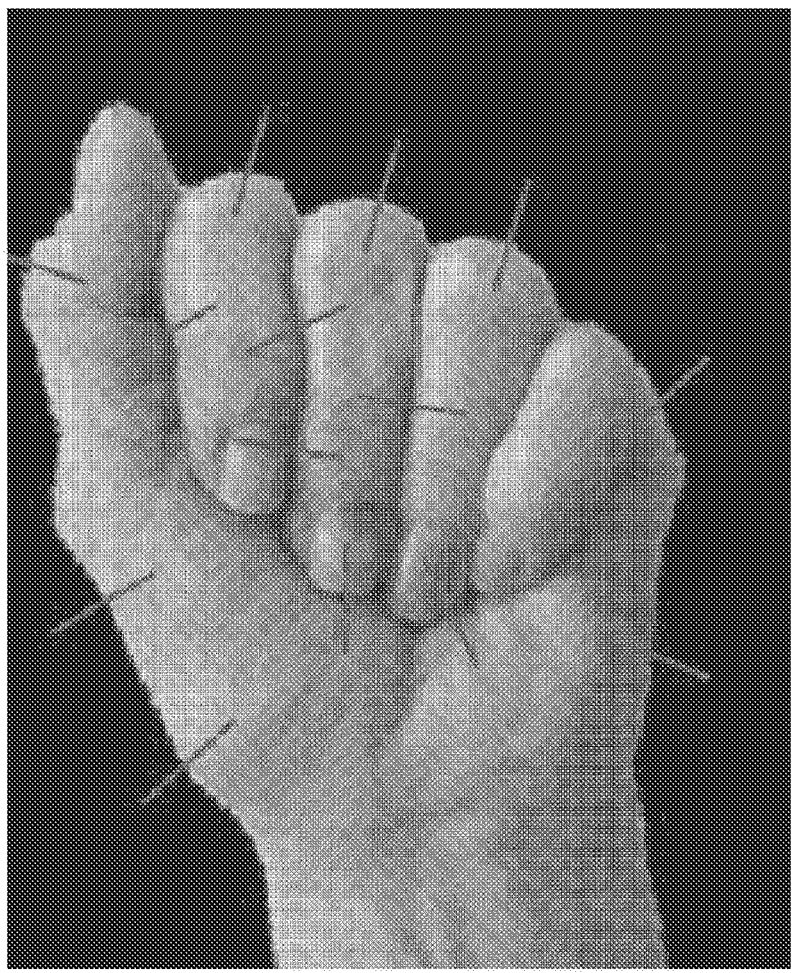
FIG. 21 illustrates a process of distinguishing a position of a hand by using a feature point in a region corresponding to a hand, according to an embodiment of the present disclosure.
Figure 22:
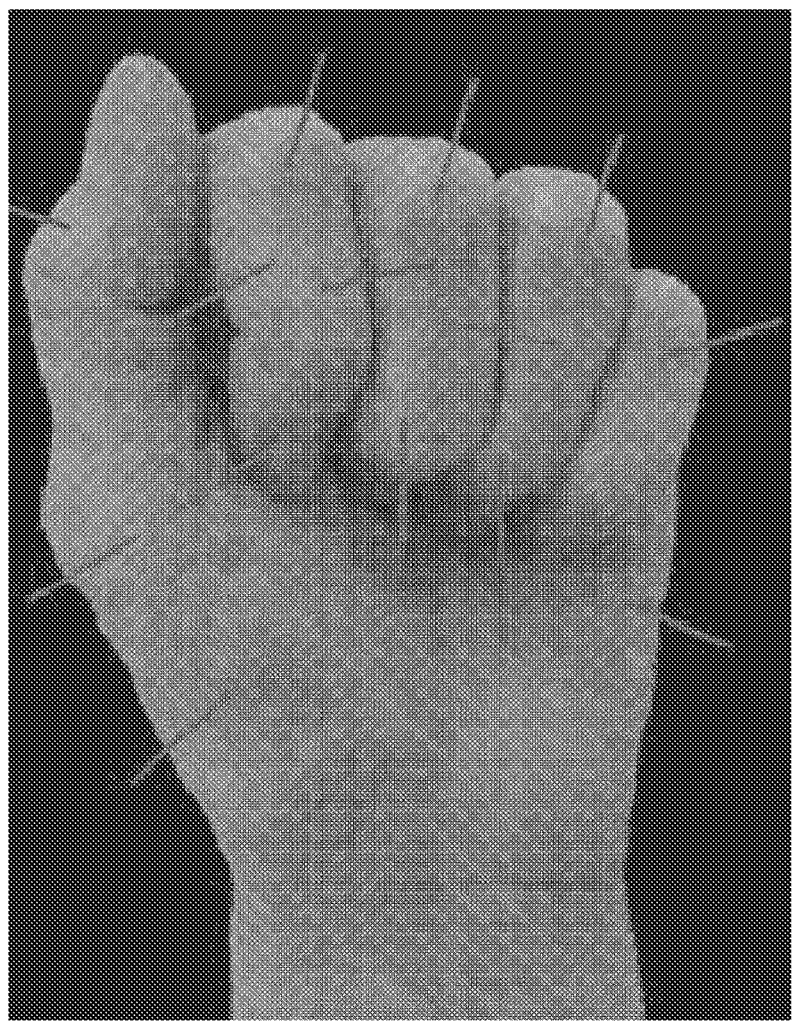
FIG. 22 illustrates a process of distinguishing a position of a hand by using a feature point in a region corresponding to a hand, according to an embodiment of the present disclosure.

However, when the information about the feature point which is included in the feature vector is also used, the positions of the hands may be distinguished. FIG. 21 illustrates information about feature points of the hand shown in FIG. 19, and FIG. 22 illustrates information about feature points of the hand shown in FIG. 20. Referring to FIGS. 21 and 22, the locations or directions of the fingers are clearly distinguished, and thus the positions of the hands are distinguishable.

Referring back to FIG. 11, at least one 3D hand model candidate corresponding to the detected parameter and the extracted feature vector may be searched for in operation S535 by using the 3D hand model database 120. Since the detected parameter includes information about a length of a target hand, an area of the target hand, or a length of each finger of the target hand, at least one 3D hand model having similar features as basic features of the target hand may be searched for in the 3D hand model database 120 by using the detected parameter. Also, a 3D hand model having a similar feature vector as a feature vector of the target hand may be re-searched for in the searched at least one 3D hand model.

Since the parameter and the feature vector corresponding to each 3D hand model are stored in the 3D hand model database 120, a parameter and a feature vector corresponding to the target hand may be compared to the parameter and the feature vector corresponding to each 3D hand model. Based on a result of the comparing, at least one 3D hand model corresponding to a parameter and a feature vector similar to those of the target hand may be specified.

Referring back to FIG. 11, one of the at least one 3D hand model candidates may be selected in operation S536. A weight may be applied to each of the at least one 3D hand model candidates.

For example, when two 2D hand images that are temporally continuous are received, it may be assumed that a change in a position of a hand in the two 2D hand images is minor. Accordingly, when at least two 3D hand model candidates are detected with respect to the temporally latter 2D hand image, a weight may be applied based on a similarity between positions of the 3D hand model candidate and a position of a 3D hand model finally detected with respect to the temporally former 2D hand image.

In other words, a higher weight may be applied to the 3D hand model candidate having a more similar position as a position of the 3D hand model corresponding to the temporally former 2D hand image. Also, a lower weight may be applied to the 3D hand model candidate having a less similar position as the position of the 3D hand model corresponding to the temporally former 2D hand image.

Also, a 3D hand model may be selected based on the applied weights from among at least one 3D hand model candidates.

Referring back to FIG. 6, second masking may be performed on a remaining region obtained by excluding a second candidate region that is selected from the candidate region and is different from the first candidate region, from the second 2D image, in operation S540. A second 3D hand model candidate may be detected in operation S550 by using the 2D hand image obtained by performing the second masking.

When the second candidate region different from the first candidate region exists in the 2D hand image, operations performed on the first candidate region may be repeatedly performed on the second candidate region.

A 3D hand model may be selected by using the first and the second 3D hand model candidates in operation S560. When at least two candidate regions are detected from a 2D hand image, one 3D hand model candidate may be detected from each candidate region. Accordingly, one of the at least two 3D hand model candidates may be selected as a 3D hand model. A 3D hand model candidate having a most similar position as a position of a 3D hand model corresponding to a temporally former 2D hand image may be selected from among the at least two 3D hand model candidates.

Figure 23:
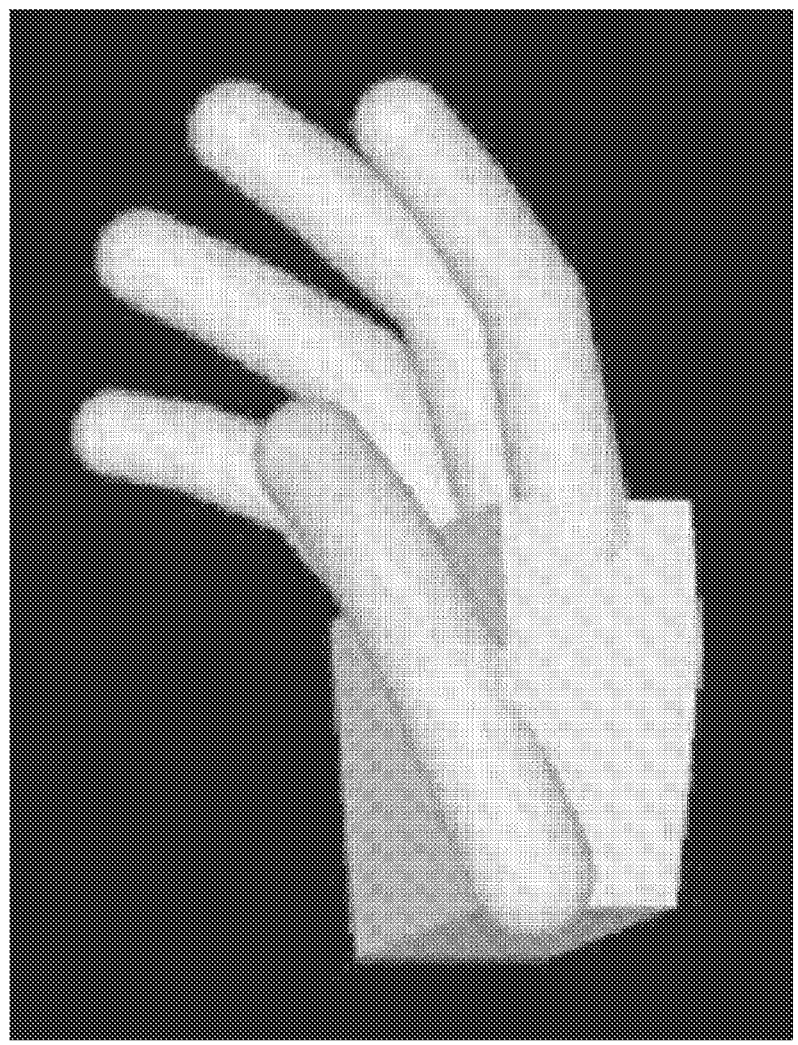
FIG. 23 is an image showing a detected 3D hand model according to an embodiment of the present disclosure.

FIG. 23 is an image showing a detected 3D hand model according to an embodiment of the present disclosure. FIG. 23 shows the 3D hand model corresponding to the hand of the 2D hand image of FIG. 5.

Figure 24:
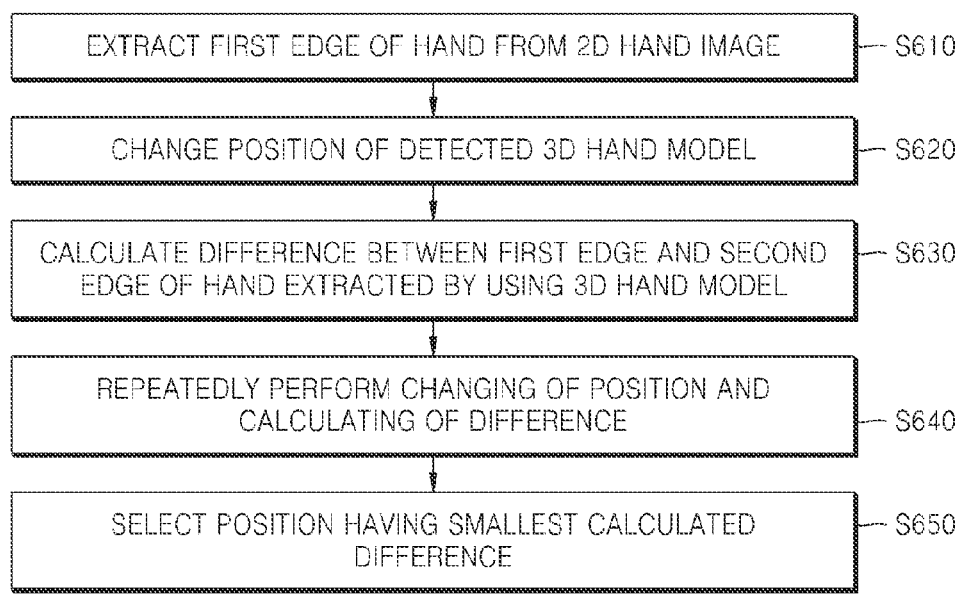
FIG. 24 is a flowchart of a process of adjusting a position of a detected 3D hand model, according to an embodiment of the present disclosure.

Referring back to FIG. 1, a position of the 3D hand model may be adjusted in operation S600 by using the 2D hand image. FIG. 24 is a flowchart of a process of adjusting the position of the detected 3D hand model in operation S600, according to an embodiment of the present disclosure.

Referring to FIG. 24, operation S600 may be performed by extracting first a first edge of the hand from the 2D hand image in operation S610. An edge of a region corresponding to the hand may be extracted as the first edge from the 2D hand image.

The position of the detected 3D hand model may be changed in operation S620. For example, a certain finger of the 3D hand model may be further bent. Alternatively, for example, the hand may be further opened or may be rotated in another angle.

When the position of the 3D hand model is changed, a gradient descent algorithm may be used. Alternatively, the position of the 3D hand model may be changed within constraints of movement of the hand or finger. For example, there may be a constraint that the finger cannot rotate 180° or more.

In operation S630, a difference between the first edge and a second edge of the hand extracted by using the 3D hand model may be calculated. The second edge of the hand may be extracted by using the 3D hand model having the changed position. The difference between the first edge and the second edge may be calculated.

The changing of the position of the 3D hand model of operation S620 and the calculating of the difference of operation S630 may be repeatedly performed in operation S640. In order to reduce the difference between the first edge and the second edge as much as possible, operation S640 may be performed at different positions of the 3D hand model.

Figure 25:
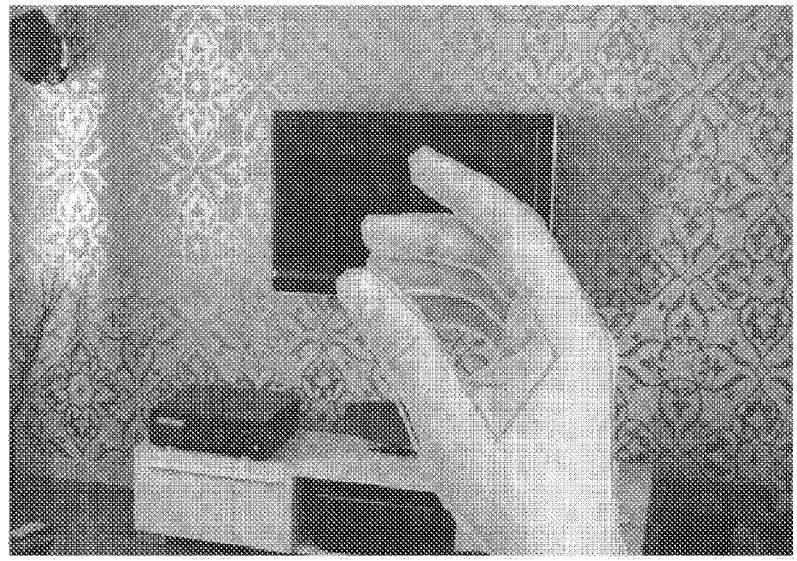
FIG. 25 is an image showing a result of adjusting a position of a 3D hand model, according to an embodiment of the present disclosure.

A position that has the smallest calculated difference may be selected from among the different positions of the 3D hand model in operation S650. Accordingly, a position of the 3D hand model that most fits the edges of the hand of the 2D hand image may be selected. FIG. 25 is an image showing a result of adjusting the position of the 3D hand model, according to an embodiment of the present disclosure.

Figure 26:
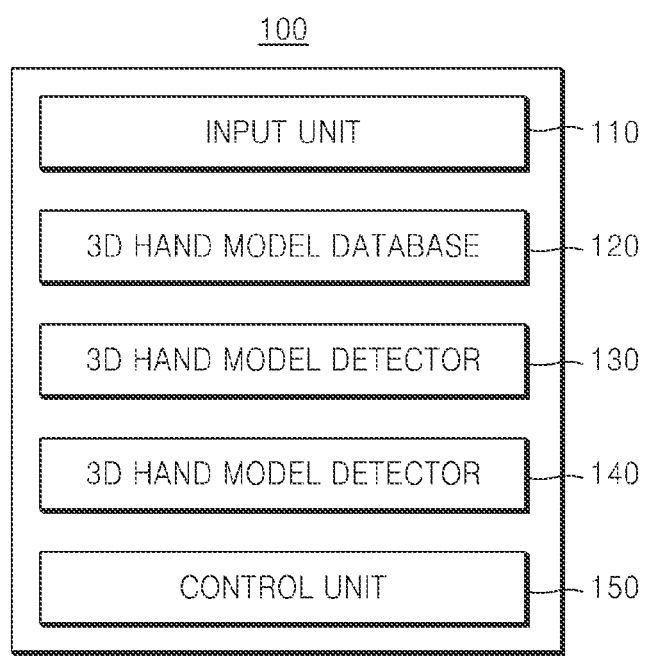
FIG. 26 is a block diagram of an apparatus for processing an image, according to an embodiment of the present disclosure.

FIG. 26 is a block diagram of the apparatus 100 for processing an image according to an embodiment of the present disclosure. Referring to FIG. 26, the apparatus 100 may include an input unit 110, a 3D hand model database 120, a 3D hand model detector 130, a position adjuster 140, and a control unit 150.

The input unit 110 may receive a 2D hand image. The input unit 110 may receive a 2D hand image obtained by photographing a hand in a standard position. Also, the input unit 110 may receive a 2D hand image obtained by photographing a hand in a target position. Since the operation of the input unit 110 corresponds to operation S200 or operation S400 described above, details thereof are not repeated here.

The 3D hand model database 120 may store information about at least one 3D hand model. Since the operation of the 3D hand model database 120 corresponds to operation S100 described above, details thereof are not repeated here.

The 3D hand model detector 130 may detect a 3D hand model corresponding to the 2D hand image by using the 3D hand model database 120. Since the operation of the 3D hand model detector 130 corresponds to operation S500 described above, details thereof are not repeated here.

The position adjuster 140 may adjust a position of the detected 3D hand model by using the 2D hand image. Since the operation of the position adjuster 140 corresponds to operation S600 described above, details thereof are not repeated here.

The control unit 150 may control the input unit 110, the 3D hand model database 120, the 3D hand model detector 130, and the position adjuster 140. Also, the control unit 150 may detect a parameter of the hand by using the 2D hand image obtained by photographing the hand in the standard position. Since the operations of the control unit 150 correspond to operations S101 through S107 and operation S300 described above, details thereof are not repeated here.

According to one or more various embodiments of the present disclosure described above, a 3D hand model corresponding to a hand image obtained by photographing a hand of a person may be generated by using the hand image. Here, a 3D hand model may be generated by using only a 2D hand image without having to use a separate 3D motion recognition apparatus. Also, the method and the apparatus 100 according to the various embodiments of the present disclosure enable a user to control a 3D region by using only a camera capable of capturing a 2D image. Also, an interface for further intuitively controlling an electronic apparatus by using only a camera capable of capturing a 2D image may be provided.

According to the one or more of various embodiments of the present disclosure, a 3D hand model corresponding to a hand image obtained by photographing a hand of a person may be generated by using the hand image.

According to the one or more various embodiments of the present disclosure, a 3D hand model corresponding to a 2D hand image may be generated by using only the 2D hand image without having to use a separate 3D motion recognition apparatus.

The method and apparatus for processing an image according to the various embodiments of the present disclosure may enable a user to control a 3D region by using only a camera capable of capturing a 2D image.

The method and apparatus for processing an image, according to the various embodiments of the present disclosure may provide an interface for further intuitively controlling an electronic apparatus by only using a camera capable of capturing a 2D image.

While the present disclosure has been shown and described with reference to the various embodiments thereof, it will be understood by those skilled in the art that various changes in form and details may be made therein without departing from the spirit and scope of the present disclosure as defined by the following claims and their equivalents.

What is claimed is:

1. A method of processing an image, the method comprising:
preparing, using at least one processor, a three-dimensional (3D) hand model database comprising 3D hand models with lengths of size features;
receiving from a camera configured to capture an image of a first hand, a first two-dimensional (2D) hand image obtained by capturing an image of the first hand;
converting color information of pixels included in the first 2D hand image into monochrome information;
extracting, using the at least one processor, a feature vector from an analysis of the first 2D hand image based on the monochrome information, the feature vector corresponding to a position of the first hand;
determining a parameter from the analysis of the first 2D hand image, the parameter corresponding to an estimated size feature of the first hand; and
detecting a first 3D hand model corresponding to the first 2D hand image by using the parameter and the feature vector to search the 3D hand model database,
wherein the estimated size feature comprises an estimated length of a portion of the first hand,
wherein the detecting comprises:
detecting the first 3D hand model in the 3D hand model database by comparing the estimated size feature with a size feature of the first 3D hand model;
detecting at least one candidate region corresponding to the first hand from the first 2D hand image;
performing a first masking on a remaining region obtained by excluding a first candidate region selected from the at least one candidate region from a second 2D hand image;
detecting a first 3D hand model candidate based on the second 2D hand image obtained by performing the first masking; and
selecting the first 3D hand model based on the first 3D hand model candidate, and
wherein the detecting of the at least one candidate region comprises detecting at least one region in which movement is detected from the first 2D hand image.

2. The method of claim 1, wherein the preparing of the 3D hand model database comprises:
capturing a second 3D hand model corresponding to a second hand by using a motion capture apparatus;
setting a parameter for the second 3D hand model;
changing a position of the second 3D hand model;
projecting the second 3D hand model on a 2D image;
extracting a feature vector from the 2D image; and
storing the parameter, the position of the second 3D hand model, and the feature vector in the 3D hand model database.

3. The method of claim 2, wherein the parameter comprises at least one of a length of the second 3D hand model, an area of the second 3D hand model, or a length of each finger included in the second 3D hand model.

4. The method of claim 1,
wherein the detecting of the at least one candidate region comprises, detecting at least two candidate regions,
wherein the method further comprises, after detecting the first 3D hand model candidate:
performing a second masking on a remaining region obtained by excluding from the first 2D hand image a second candidate region that is selected from the at least one candidate region, the second candidate region being different from the first candidate region, and
detecting a second 3D hand model candidate based on the second 2D hand image obtained by performing the second masking, and
wherein the first 3D hand model is selected from among the first 3D hand model candidate and the second 3D hand model candidate.

5. The method of claim 1, wherein the detecting of the at least one candidate region comprises detecting at least one region corresponding to a skin color from the first 2D hand image based on a skin color model.

6. The method of claim 5, further comprising, after the selecting of the first 3D hand model candidate, updating the skin color model based on information about the at least one candidate region.

7. The method of claim 1, wherein the detecting of the at least one candidate region comprises detecting at least one region corresponding to a skin color from the first 2D hand image based on a depth image captured by using a depth camera and a skin color model.

8. The method of claim 1, wherein the detecting of the first 3D hand model candidate comprises:
extracting a feature vector from the second 2D hand image obtained by performing the first masking;
searching for at least one third 3D hand model candidate corresponding to the extracted feature vector using the 3D hand model database; and
selecting one of the at least one third 3D hand model candidate as the first 3D hand model candidate.

9. The method of claim 8, wherein the selecting one of the at least one third 3D hand model candidate as the first 3D hand model candidate comprises:
applying a weight to each of the at least one third 3D hand model candidate; and
selecting one of the at least one third 3D hand model candidate according to the applied weights.

10. The method of claim 8, wherein the extracting of the feature vector from the second 2D hand image obtained by performing the first masking comprises:
extracting information about a shape of the first candidate region based on the second 2D hand image obtained by performing the first masking;
extracting a feature point in the first candidate region based on the second 2D hand image obtained by performing the first masking; and
generating the feature vector based on the extracted information about the shape of the first candidate region and the extracted feature point.

11. The method of claim 10, wherein the extracting of the feature point includes determining at least one of a center of points having analogous directions of normal lines of edges from among edges of the first candidate region, or a point where a color significantly changes in the first candidate region.

12. A method of processing an image, the method comprising:
preparing a three-dimensional (3D) hand model database comprising 3D hand models with lengths of size features;
receiving, from a camera configured to capture an image of a first hand, a first two-dimensional (2D) hand image obtained by capturing an image of the first hand in a first position;
converting color information of pixels included in the first 2D hand image into monochrome information;
detecting, using at least one processor, a first parameter of the first hand based on the first 2D hand image, the first parameter corresponding to an estimated size feature of the first hand;
detecting a feature vector of the first 2D hand image based on the monochrome information, the feature vector corresponding to a position of the first hand;
receiving, using a sensor, a second 2D hand image obtained by capturing an image of the first hand in a second position; and
detecting a first 3D hand model corresponding to the second 2D hand image using the 3D hand model database, the feature vector of the first 2D hand image, and the first parameter,
wherein the estimated size feature comprises an estimated length of a portion of the first hand,
wherein the detecting comprises detecting the first 3D hand model in the 3D hand model database by comparing the estimated size feature with a size feature of the first 3D hand model,
detecting at least one candidate region corresponding to the first hand from the second 2D hand image;
performing a masking on a remaining region obtained by excluding one candidate region selected from among the at least one candidate region from the second 2D hand image;
detecting at least one 3D hand model candidate based on the second 2D hand image obtained by performing the masking and the first parameter; and
selecting one of the at least one 3D hand model candidate as the first 3D hand model.

13. The method of claim 12, wherein the preparing of the 3D hand model database comprises:
capturing a second 3D hand model corresponding to the second 2D hand image by using a motion capture apparatus;
setting a second parameter for the second 3D hand model;
changing a position of the second 3D hand model;
projecting the second 3D hand model on the second 2D hand image;
extracting a feature vector from the second 2D hand image; and
storing the second parameter, the position of the second 3D hand model, and the feature vector in the 3D hand model database.

14. The method of claim 12, wherein the detecting of the at least one 3D hand model candidate comprises:
extracting a feature vector from the second 2D hand image obtained by performing the masking; and
searching for the at least one 3D hand model candidate corresponding to the first parameter and the extracted feature vector using the 3D hand model database.

15. The method of claim 14, wherein the extracting of the feature vectors includes extracting at least one feature point by determining at least one of a center of points having analogous directions of normal lines of edges from among edges of the candidate region, or a point where a color significantly changes in the candidate region.

16. The method of claim 12, further comprising, after the detecting of the first 3D hand model, adjusting a position of the first 3D hand model based on the second 2D hand image.

17. The method of claim 16, wherein the adjusting of the position of the first 3D hand model comprises:
    extracting a first edge of the first hand from the second 2D hand image;
    changing a position of the first 3D hand model;
    calculating a difference value by comparing the first edge and a second edge of the first hand extracted using the first 3D hand model;
    acquiring a plurality of difference values for a plurality of positions of the first 3D hand model; and
    selecting a position from among the plurality of positions of the first 3D hand model that has a smallest corresponding difference value.

18. An apparatus configured to process an image, the apparatus comprising:
    a memory configured to store instructions therein;
    a camera configured to capture a first two-dimensional (2D) hand image of a first hand;
    a database configured to store information about at least one three-dimensional (3D) hand model, the database comprising 3D hand models with lengths of size features; and
    at least one processor,
    wherein, upon execution of the instructions, the at least one processor is configured to:
        convert color information of pixels included in the first 2D hand image into monochrome information;
        extract a feature vector from an analysis of the first 2D hand image based on the monochrome information, the feature vector corresponding to a position of the first hand,
        determine a parameter from the analysis of the first 2D hand image, the parameter corresponding to an estimated size feature of the first hand, and
        detect the at least one 3D hand model corresponding to the first 2D hand image using the 3D hand model database, the detecting comprising using the parameter and the feature vector,
    wherein the estimated size feature comprises an estimated length of a portion of the first hand,
    wherein the detecting further comprises detecting the at least one 3D hand model in the 3D hand model database by comparing the estimated size feature with a size feature of the at least one 3D hand model,
    wherein the detecting of the at least one 3D hand model comprises:
        detecting at least one candidate region corresponding to the first hand from the first 2D hand image;
        performing a first masking on a remaining region obtained by excluding a first candidate region selected from the at least one candidate region from a second 2D hand image;
        detecting a first 3D hand model candidate based on the second 2D hand image obtained by performing the first masking; and
        selecting the at least one 3D hand model based on the first 3D hand model candidate, and
    wherein the detecting of the at least one candidate region comprises detecting at least one region in which movement is detected from the first 2D hand image.

19. The apparatus of claim 18, wherein the at least one processor is further configured to adjust a position of the detected 3D hand model based on the first 2D hand image.

* * * * *